US012333561B2

(12) United States Patent
Janani et al.

(10) Patent No.: US 12,333,561 B2
(45) Date of Patent: Jun. 17, 2025

(54) ANOMALY DETECTION SYSTEMS AND METHODS

(71) Applicant: Verint Americas Inc., Alpharetta, GA (US)

(72) Inventors: Hamed Janani, Vancouver (CA); Anirudh Challa, Burnaby (CA); Hong Wang, San Mateo, CA (US); Mohamad Al-Sharara, Westmount (CA); José R. Benkí, Ann Arbor, MI (US); Zealand Cooley, Albion, MI (US)

(73) Assignee: Verint Americas Inc., Alpharetta, GA (US)

( * ) Notice: Subject to any disclaimer, the term of this patent is extended or adjusted under 35 U.S.C. 154(b) by 285 days.

(21) Appl. No.: 17/840,279

(22) Filed: Jun. 14, 2022

(65) Prior Publication Data

US 2023/0401591 A1  Dec. 14, 2023

(51) Int. Cl.
*G06Q 30/0203* (2023.01)
*G06F 18/214* (2023.01)
*G06Q 30/0201* (2023.01)

(52) U.S. Cl.
CPC ....... *G06Q 30/0203* (2013.01); *G06F 18/214* (2023.01); *G06Q 30/0201* (2013.01)

(58) Field of Classification Search
CPC ........ G06F 1/00–2123/00; G06Q 10/00–50/00
USPC .............................................. 705/7.11–7.42
See application file for complete search history.

(56) References Cited

U.S. PATENT DOCUMENTS

| | | | |
|---|---|---|---|
| 9,384,450 B1* | 7/2016 | Cordes | G06N 20/00 |
| 2006/0053058 A1* | 3/2006 | Hotchkiss | G06Q 30/0211 |
| | | | 705/7.32 |
| 2006/0121434 A1* | 6/2006 | Azar | G06Q 30/0203 |
| | | | 434/350 |
| 2011/0191141 A1* | 8/2011 | Thompson | G06Q 30/0244 |
| | | | 707/E17.014 |
| 2016/0350771 A1* | 12/2016 | Gardner | G06Q 30/0203 |
| 2017/0076202 A1* | 3/2017 | George | H04L 41/142 |
| 2019/0164182 A1* | 5/2019 | Abdullah | G06F 16/245 |
| 2019/0188741 A1* | 6/2019 | Wood | G06F 17/18 |
| 2021/0035132 A1* | 2/2021 | Kopikare | G06Q 30/0203 |
| 2021/0042110 A1* | 2/2021 | Basyrov | G06N 3/006 |

* cited by examiner

*Primary Examiner* — Alan S Miller
(74) *Attorney, Agent, or Firm* — Christopher M. Scherer; Erin Ella Block; DeWitt LLP

(57) ABSTRACT

An anomaly detection system using machine learning to generate predicted survey scores for a given duration and a given metric based on historic survey score data. The system compares a predicted survey score to the actual survey score and identifies anomalous actual survey scores. The anomaly detection system trains a plurality of survey score prediction models using historic survey score data. Each survey score prediction model is based on a specific survey score metric and a specific duration. The survey score prediction models generate expected survey score results for the given duration and the given metric. Based on the user-determined filtering and tolerances, the system determines if the actual survey score result is anomalous. The system generates reports for the detected anomalies and continually updates the survey score prediction models with newly obtained actual survey results, thereby improving the anomaly detection accuracy over time.

20 Claims, 8 Drawing Sheets

FIG. 4A

Generate an expected survey score from the survey score prediction model based on the current survey score data
416

Receive user-defined confidence level and user-defined standard deviation augmentation
418

Generate a confidence interval for the expected survey score based on the user-defined confidence level
420

Generate a standard deviation band for the expected survey score based on the user-defined standard deviation augmentation
422

Determine the actual survey score result is an anomaly when the actual survey score result is outside of the confidence interval and outside of the standard deviation band
424

Determine the actual survey score result is not an anomaly when the actual survey score result is within the confidence interval or within the standard deviation band
426

Generate an anomaly report for the actual survey score result
428

Display the anomaly report on an employee device
430

FIG. 4B

ANOMALY DETECTION SYSTEMS AND METHODS

FIELD

The present disclosure is directed to machine learning predictions to detect anomalies in collected data.

BACKGROUND

Many customer service companies and organizations send and receive customer surveys in an effort to determine many aspects pertaining to how satisfied customers are, the success of products, areas requiring improvement, etc. To make the most of the customer survey results, companies attempt to generate scores and other metrics so the company can compare survey results over time. Due to the volume of survey data, traditional systems are focused on collecting data, categorizing data, scoring data for different metrics the company would like to score, and analyzing the scored metrics over time to provide indications regarding the trajectory of the metrics. One use case for the analysis of scoring metrics is to identify abrupt changes in the value of a survey metric that represent a real change in customer experience which are not part of the regular day-to-day variation in that metric. However, current systems only provide the data metric information, leaving companies to analyze the metrics and score in an attempt to determine if a result is anomalous or simply part of regular day-to-day variation.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, according to certain embodiments a method is disclosed that includes receiving historic survey score data from a survey scores database. The method includes generating a set of training survey score data for a given scored survey metric and a given duration from the historic survey score data. The method furthermore includes training a survey score prediction model for the given scored survey metric and the given duration with the set of training survey score data. The method in addition includes receiving an actual survey score result associated with a scored survey metric and a duration for a specific date. The method moreover includes determining the scored survey metric and the duration for the actual survey score result match the given scored survey metric and the given duration for the survey score prediction model. The method also includes passing a current survey score data associated with the actual survey score result to the survey score prediction model. The method furthermore includes generating an expected survey score for the specific date based on the current survey score data using the survey score prediction model. The method in addition includes receiving a user defined confidence level and a user defined standard deviation augmentation. The method moreover includes generating a confidence interval for the expected survey score based on the user defined confidence level. The method also includes generating a standard deviation band for the expected survey score based on a standard deviation and the user defined standard deviation augmentation. The method furthermore includes determining the actual survey score result is an anomaly when the actual survey score result is outside the confidence interval and when the actual survey score result is outside of the standard deviation band. The method in addition includes determining the actual survey score result is not an anomaly when the actual survey score result is within the confidence interval or when the actual survey score result is within the standard deviation band. The method moreover includes generating an anomaly report for the actual survey score result. Other embodiments of this aspect include corresponding computer systems, apparatus, and computer programs recorded on one or more computer storage devices, each configured to perform the actions of the methods.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

BRIEF DESCRIPTION OF THE DRAWING(S)

FIGS. 4A and 4B depict a flowchart of an example of a method for anomaly detection using survey score prediction models, according to certain embodiments.

DETAILED DESCRIPTION

Figure 1A:
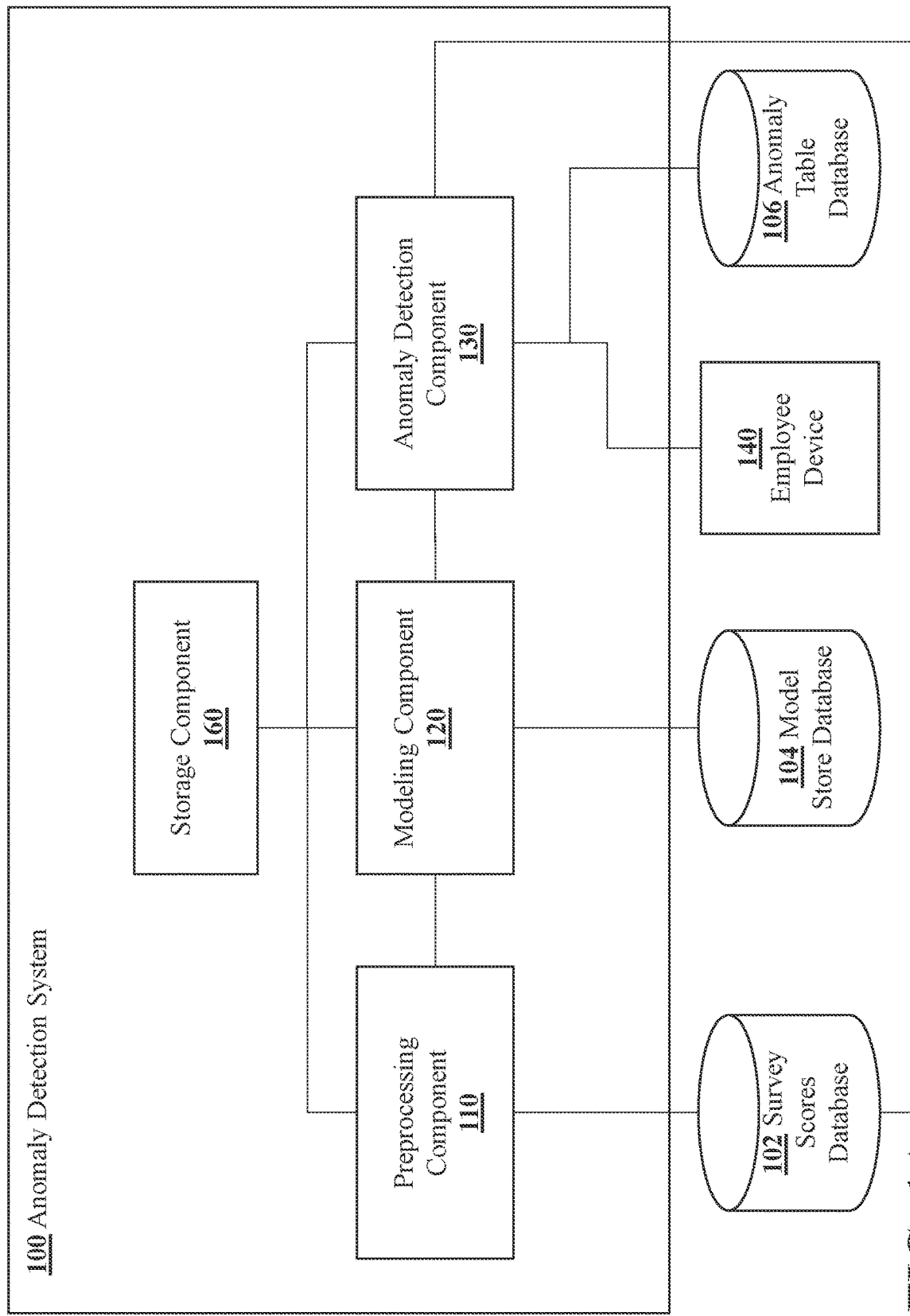
FIG. 1A depicts an example of an anomaly detection system, according to certain embodiments.

For companies and organizations looking to maximize the value of survey data there is an unmet need in the art for a system capable of using machine learning to determine if current survey data collected is anomalous to what is expected. Identifying anomalous data highlights unpredicted or abnormal events which may be of interest to the company. Anomaly detection in survey data may allow a company to quickly pinpoint and identify customer support issues/problems, successful and unsuccessful products and product promotions, a need for additional customer service training, etc.

What might be considered an anomaly to one company may not qualify as an anomaly for another company. Additionally, a company may want to be able to change its definition of anomaly over time or for comparison. Therefore, there is further an unmet need in the art for a system of detecting anomalies in current survey data that allows the user (company) to dynamically determine how strictly to define what data is anomalous. Providing the dynamic determination of what qualifies as an anomaly allows companies to view and review anomalies based on changing constraints and allows companies greater control over what the system identifies as an anomaly.

An anomaly detection system is capable of using machine learning to generate predicted survey scores for a given duration and a given metric based on historic survey score data. The system can then compare the predicted survey scores to actual survey scores and identify anomalous actual survey scores. In this context, an actual survey score is an averaged or grouped score for all surveys completed for a particular duration (i.e. daily, weekly, monthly, etc.) for a particular scored survey metric (i.e. customer satisfaction metric, likelihood customer will recommend product metric, customer user experience metric, etc.). The scored survey metrics are based on survey data provided by an end-user and, according to certain embodiments, may be recently completed by the end-user relative to the time that anomaly detection is carried out as disclosed herein. The anomaly detection system trains a plurality of survey score prediction models using historic survey score data. Each survey score prediction model is based on a specific survey score metric, for example, customer satisfaction, and a specific duration, for example, daily or weekly. Once trained, each survey score prediction model can generate expected survey score results for the given duration and the given metric. The system provides users with user-determined filtering to define anomalous actual survey results. The system can then compare the expected survey score result to the actual survey score result and, based on the user-determined filtering and tolerances, determines if the actual survey score result is anomalous. The actual survey score result is considered anomalous if it differs sufficiently from the expected survey score result based on the user-determined filtering and tolerances. The system generates reports for the detected anomalies. Additionally, the system continually updates the survey score prediction models with newly obtained actual survey results, thereby improving the anomaly detection accuracy over time.

Figure 1B:
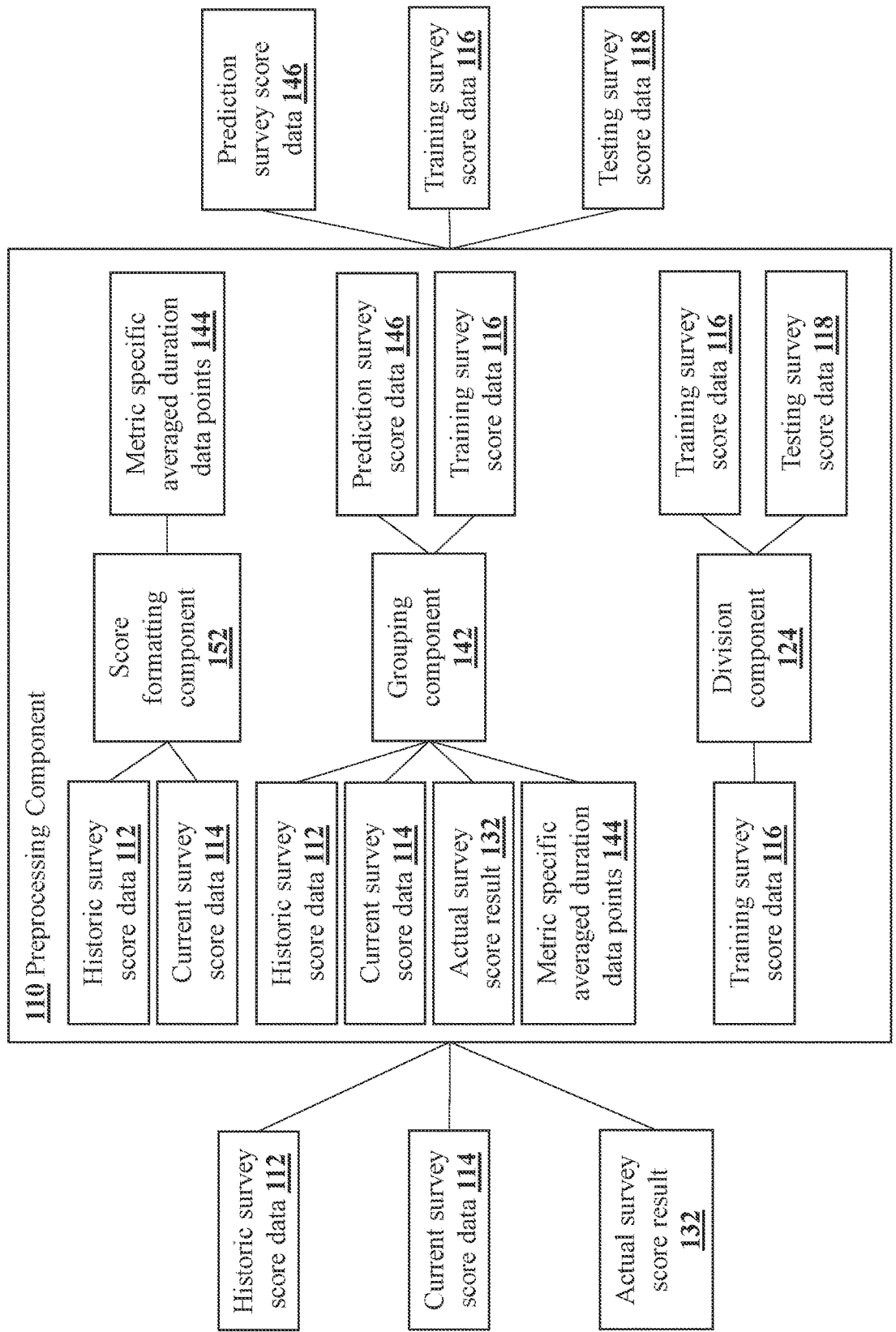
FIG. 1B depicts and example of a preprocessing component used in the anomaly detection system, according to certain embodiments

FIG. 1A depicts an example embodiment of an anomaly detection system 100 with its components, services, and processes according to certain embodiments. FIG. 1B depicts an example of a preprocessing component 110 used in the anomaly detection system 100, according to certain embodiments.

In an embodiment, the anomaly detection system 100 may be part of a customer service center system (not shown) or may be a separate component integrated with the customer service center system or any other company system that stores survey data and/or metrics pertaining to survey data. The anomaly detection system 100 interacts with a survey score database 102 to receive historic survey score data 112 and current survey score data 114 and a model store database 104 to generate, receive, and store predictive survey score models. The anomaly detection system 100 includes a preprocessing component 110 to prepare the historic survey score data 112 to generate training survey score data 116, a modeling component 120 to train and update survey score prediction models for predicting expected survey scores for a given duration, and an anomaly detection component 130 to determine if the actual survey score result 132 for a given duration is an anomaly and generate anomaly reports and anomaly data. Each of these components will be described in greater detail below. Employees of company utilizing the system (hereinafter users) may interact with the anomaly detection system 100. The anomaly detection system 100 optionally includes one or more employee devices 140 useable by users for interacting with the anomaly detection system 100 and for viewing anomaly reports and anomaly data.

Survey score prediction models are models trained to predict expected survey score results. Each model is trained to predict expected survey score results for a given scored survey metric and a given duration. Scored survey metrics are different categories represented in customer survey responses to questions on customer surveys that a company may want to score. As a non-limiting example, the different scored survey metrics may be that of a customer satisfaction score, a score indicating how likely a customer will recommend product or service, a score indicating customer's opinion on the look and feel of the user experience, a score indicating ease of order processing and/or site performance, how likely the customer is to make further purchases, etc. The particular duration is any defined interval of a time period during which the user would like to be able to predict an expected score for a particular scored survey metric, for example, daily, weekly, monthly, etc., based on surveys that are received from customers during a given date/date range corresponding to the interval of the duration. It should be understood that a model can be generated for any user-defined metric and any user-defined duration; the above are merely examples. Each survey score prediction model is initially trained on training survey score data 116 provided as time series event data of the average score for the given scored survey metric for the given duration provided by the historic survey score data 112.

Historic survey score data 112 are historical values for the scores computed from customer surveys for the different scored survey metrics. In an embodiment, the historic survey score data 112 is stored as a per survey score for each scored survey metric generated for the particular survey. In an embodiment, the historic survey score data is stored as an average of all survey scores for the associated scored survey metric based on a given duration. In other words, the historic survey score data for a daily duration for the customer satisfaction scored survey metric is the average for all scores received for that metric on a daily basis, according to certain embodiments; in other embodiments, other statistical methods may be employed for representations of aggregate scores, such as a median, a floor, a ceiling, and more complex representations such as using a time series, vectors, matrices, formulaic expressions, or other representations. As another non-limiting example, the historic survey score data for a weekly duration for the customer satisfaction scored survey metric is the average of all scores received for that metric on a weekly basis.

All historic survey score data 112 will include a numerical score, an associated scored survey metric, and an associated timestamp for the received survey. Historic survey score data that is an average of survey scores may also include the total number of survey respondents contributing to the average score. In an embodiment, each historic survey score data 112 may be represented as a historic score data structure including fields for all associated information. In an embodiment, each historic survey score data 112 may be represented as an object, including attributes for all associated information. It should be understood that these are merely examples and that any appropriate structure for associating the numerical score and related information may be used.

An actual survey score result 132 is an averaged or grouped score for all surveys completed for a particular duration (i.e. daily, weekly, monthly, etc.) for a particular scored survey metric (i.e. customer satisfaction metric, likelihood customer will recommend product metric, customer user experience metric, etc.). The scored survey metrics are based on survey data provided by an end-user and, according to certain embodiments, may be recently completed by the end-user relative to the time that anomaly detection is carried out as disclosed herein. According to certain embodiments the actual survey score result is the average of the scored survey metric for all surveys during the duration for the given date/date range; in other embodiments, other statistical methods may be employed for representations of aggregate scores, such as a median, a floor, a ceiling, and more complex representations such as using a time series, vectors, matrices, formulaic expressions, or other representations.

Current survey score data 114 is a set of time series events from historic survey score data 112. However, current survey score data 114 is typically not used in the initial training of survey score prediction models. Current survey score data 114 is used for determining if an actual survey score result is an anomaly by providing it to a trained survey score prediction model to generate an expected score for the duration and scored survey metric of the actual survey score result. Current survey score data 114 can also be used to update the training survey score prediction model.

As discussed above, the survey score prediction models are trained to predict an expected survey score for a particular date/date range of a given scored survey metric and a given duration based on receipt of current survey score data 114 as a set of time series events for a given lookback period. The lookback period denotes the number of time series events required for the trained survey score prediction model to generate an expected survey score for the particular date/date range. For example, if the lookback period is 7 and the duration is daily, the current survey score data 114 would include the preceding 7 daily average scores for the given date.

In an embodiment the lookback period is N number of time series events of consecutive current survey score data points 114 from the specific date/date range to be predicted. For example, in an embodiment, to predict the expected survey score for a given date/date range, the current survey score data would include N number of consecutive historic survey score data from the dates immediately preceding the given date/date range. N is the number of preceding scores (lookback points) required to provide to the survey score prediction model to predict the expected survey score for the given date/date range. It should be understood that N could be any whole integer that is at least 1 and less than the total number of scores available. To improve the prediction for seasonality N should be of sufficient quantity, such as 7. An N value of 7 has been chosen as an example because through testing an N value of 7 has shown to be sufficient to account for seasonality yet not so large that processing efficiency is affected. Therefore, in this embodiment, to obtain a prediction from a daily score model for customer service metric on Oct. 31, 2021 the current survey score data 114 would include daily historic survey score data 112 for the customer satisfaction metric from the 7 days preceding Oct. 31, 2021.

The N value for the current survey score data 114 is determined based on the particular survey score prediction model being used, the data the model is trained on, and the data processed by the model. Each survey score prediction model may be trained on and tuned to a different N value.

The current survey score data 114 is also used to update the trained survey score prediction model associated with the current survey score data 114. The current survey score data 114 may also include the actual survey score result 132 for the given date/date range so the survey score prediction model can be updated while making the prediction. Therefore, in the above example, the actual survey score result 132 would be the daily historic survey score data 112 for the customer service metric on Oct. 31, 2021.

In an embodiment, historic survey score data 112 and current survey score data 114 are stored by the customer service center system in the survey scores database 102. In an embodiment, historic survey score data 112 and current survey score data 114 may be stored by the customer service center system in any appropriate media storage.

The anomaly detection system 100 includes a preprocessing component 110 to receive historic survey score data 112 from the survey scores database 102. The preprocessing component 110 performs multiple processing procedures, described further below, on the historic survey score data 112 to generate training survey score data 116 for training survey score prediction models. In an embodiment, the preprocessing component 110 may be a processor or a combination of a processing system and a storage system with a preprocessing software component and optional preprocessing storage. The preprocessing component 110 may also receive and process current survey score data 114 to generate update survey score data 122 to allow the system to generate an expected survey score for a given date/date range and allow the system to update survey score prediction models generated by the modeling component 120.

The preprocessing component 110 processes historic survey score data 112 to generate training survey score data 116 for training survey score predication models. In an embodiment, the customer service center system and/or the anomaly detection system 100 provides a request to the preprocessing component 110 to generate training survey score data 116 to train a particular survey score prediction model based on a given scored survey metric and a given duration and/or a plurality of survey score prediction models, each based on a given scored survey metric and a given duration.

In an embodiment, the request is generated based any one of a user requesting the creation of the survey score prediction model, the system attempts to predict the score for a scored survey metric and duration where a survey score prediction model does not already exist or has not been updated within a threshold time, such as one month, six months, etc., and/or rules governing the automated generation of a particular survey score prediction model. As a non-limiting example, one such rule may be based on the number of history survey score data results stored in the survey scores database 102 for the given scored survey metric. For example, once a predetermined number of points of data for a duration (daily, weekly, etc.) for a scored survey metric are stored automatically, instructing the generation of a survey score prediction model for the duration and scored survey metric. The predetermined number may be determined by the users of the system and updated as desired. In an embodiment, the predetermined number is a number of data points that is anticipated to result in an error rate above a desired confidence level, for example the error rate once trained is less than ten percent. Over time, the anomaly detection system 100 or the customer service center system may learn and update the predetermined number based on the analysis of survey score prediction model training results by identifying the number of data points needed by the models to achieve an error rate below a desired error rate threshold.

As another non-limiting example, another rule may be based on the duration that historic survey score data has been collected for a particular scored survey metric. For example, once the customer service scored survey metric has been present in the system for six (6) months survey score prediction models will be generated for the customer service scored survey metric irrespective of the actual number of data points collected. It should be understood that the above are merely examples of rules for automatic survey score prediction model generation/update requests and they should not be considered limiting.

In an embodiment, the preprocessing component 110 receives historic survey score data 112 from the survey scores database 102 based on the specific request from the system receiving only historic survey score data 112 from the given scored survey metric and given duration for the survey score prediction model to be trained. In this embodiment, if the historic survey score data 112 is not stored as an average score for the given time period, the customer service center system processes the historic survey score data 112 and provides it to the preprocessing component 110 as average scores for the given duration for the set or subset requested of historic survey score data 112. In an embodiment, the preprocessing component 110 receives all historic survey score data 112 from the survey scores database 102 or a subset of all historic survey score data 112 as stored which may include a plurality of scored survey metrics and may include per survey score results or some other averaged duration score result (for example, a daily or weekly average score result).

Training survey score data 116 is created from the historic survey score data 112. Training survey score data 116 is historic survey score data 112 that has been processed by the preprocessing component 110 to be in the format required to train the survey score prediction models. Training survey score data 116 is a chronological set of time series events being the average score from the historic survey score data 112 for the given duration for a given scored survey metric.

In an embodiment, similar to how current survey score data 114 is provided to the modeling component 120 to generate an expected survey score, each training survey score data 116 includes N consecutive metric-specific averaged duration data points 144 and/or historic survey score data 112 for the given scored survey metric and the given duration and the N+1 next consecutive metric specific averaged duration data point 144 and/or historic survey score data 112 for the given scored survey metric and the given duration as an actual training survey score result. It should be understood that N could be any whole integer that is at least 1 and less than the total number of scores available. Generally, the same number of lookback points are used for the training and the application of the model to new data. However, it would be possible that the number of lookback points may be different for training and application. The grouped and chronological arrangement of training survey score data 116 allows the survey score prediction models to be incrementally trained in an unsupervised manner such that the anomaly detection system can determine the error between the expected survey score and the actual training survey score result and adjust the weights of the model based on the error thereby improving the model's prediction accuracy with each set of training survey score data 116.

In embodiments where the preprocessing component 110 receives historic survey score data 112 for a plurality of scored survey metrics and/or for a duration or durations that do not match the given duration for the survey score prediction model generation request, the preprocessing component 110 uses a score formatting component 152 to generate metric specific averaged duration data points 144. Metric-specific averaged duration data points 144 are received historic survey score data 112 that only includes the given scored survey metric and has been averaged based on the given duration for the survey score prediction model to be generated/updated. The score formatting component 152 analyzes all received historic survey score data 112 and removes any data points from the historic survey score data 112 that do not match the given scored survey metric for the survey score prediction model to be generated/updated.

Once the historic survey score data 112 only consists of data associated with the given scored survey metric, the score formatting component 152 analyzes the duration associated with each data point of the historic survey score data 112 and generates metric-specific averaged duration data points 144 by computing an average score from the historic survey score data 112 for dates/date ranges of the given duration. For example, if the historic survey score data 112 is provided on a per survey basis and the given duration is daily, the score formatting component 152 calculates the daily average score for the historic survey score data 112. As another non-limiting example, if the historic survey score data 112 is provided on a daily average basis and the given duration is weekly, the score formatting component 152 calculates the weekly average score for the historic survey score data 112. As a further non-limiting example, if the historic survey score data 112 is provided on a daily average basis and the given duration is daily, the score formatting component 152 does not need to recalculate the daily average score for the historic survey score data 112.

The metric-specific averaged duration data points 144 are a set of average survey scores for the given duration and given scored survey metric generated from the provided historic survey score data 112. Metric-specific averaged duration data points 144 each include an average numerical score, a duration (e.g., daily, weekly, monthly), a date/date range associated with each average numerical score (the actual date/date range of the survey scores comprising the average numerical score—e.g., the date for daily durations, the week for weekly durations, the month for monthly durations), and the survey metric associated with each score.

In an embodiment, the metric-specific averaged duration data points 144 may be formatted as data structures with a plurality of fields for associated data or formatted as objects with attributes for associated data. In embodiments, the format of metric-specific averaged duration data points 144 is the same format of historic survey score data 112. It should be understood that the metric-specific averaged duration data points 144 container structures listed above are merely examples and should not be considered limiting.

The preprocessing component 110 uses a grouping component 142 to process metric-specific averaged duration data points 144 for the given scored survey metric and the given duration and historic survey score data 112 for the given scored survey metric and the given duration to generate training survey score data 116. The survey score prediction models are trained on a training survey score data 116. The training survey score data 116 allows the survey score prediction models to be incrementally trained in an unsupervised manner such that the anomaly detection system can determine the error between the expected survey score and the actual training survey score result and adjust the weights of the model based on the error thereby improving the model's prediction accuracy with each set of training survey score data 116.

The grouping component 142 receives the metric-specific averaged duration data points 144 for the given scored survey metric and the given duration and historic survey score data 112 for the given scored survey metric and the given duration of the survey score prediction model to be trained to generate training survey score data 116. The grouping component 142 arranges the received metric-specific averaged duration data points 144 and historic survey score data 112 in chronological order. In an embodiment, the grouping component 142 will remove any received metric-specific averaged duration data points 144 and historic survey score data 112 that have no survey score results or the survey score result is zero (which indicates that no survey score results were received for that date/date range associated with the data point). Removing the metric-specific averaged duration data points 144 and historic survey score data 112 that do not include any survey score results for the given duration and given scored survey metric keeps the model from assigning a score of zero for the date.

Once the metric-specific averaged duration data points 144 and the historic survey score data 112 are ordered chronologically, and dates/date ranges with no scores removed (if called for by the embodiment), the grouping component 142 generates training survey score data 116 for each set of consecutive N data points starting with the earliest date/date range. The training survey score data includes the score associated with each of N consecutive data points (either metric-specific averaged duration data points 144 and historic survey score data 112), separated by a special character which indicates the beginning and end of each score and a final N+1 next consecutive data point (either metric specific averaged duration data points 144 or historic survey score data 112). The N+1 next consecutive data point is the actual training survey score result.

As a non-limiting example, if the N number is 6, the first training survey score data 116 will include the first six (6) consecutive scores from the ordered specific averaged duration data points 144 and the historic survey score data 112 and the seventh consecutive score as the actual test survey score result. The second training survey score data 116 will include the next six (6) consecutive scores from the ordered specific averaged duration data points 144 and the historic survey score data 112 and the next score preceding the six scores. In an embodiment, the next six (6) consecutive scores are from data points eight through thirteen, with the seventh score being from the fourteenth data point. In an embodiment, the next six consecutive scores are from data points seven through twelve, with the seventh score being from the thirteenth data point. This embodiment uses every seventh score as both a training score and an actual test survey score result. In an embodiment, the next six consecutive scores are from data points two through eight, with the seventh score being from the ninth data point. This embodiment uses every score, starting with the seventh score until the last score, as both a training score and an actual test survey score result.

The grouping component 142 continues to generate training survey score data 116 until all scores for ordered metric-specific averaged duration data points 144 and historic survey score data 112 have been processed by the grouping component 142 or until the desired amount of training survey score data 116 has been generated. In embodiments, it is desired to generate as much training survey score data 116 as is available from historic survey score data 112 and metric-specific averaged duration data points 144. However, training is time-consuming and may result in diminishing returns in improvement of the model. Further, it may be desired to detect anomalies in already existing historic survey score data 112 rather than just starting anomaly detection on new historic survey score data from the date the model is created. Accordingly, in an embodiment, the grouping component 142 only generates training survey score data 116 until a predetermined amount of training survey score data 116 has been created. The predetermined amount of training survey score data 116 is a number of training sets great enough to train the model within a desired error amount without reaching the point of diminishing returns on the training. In an embodiment a range of ninety (90) to one hundred and thirty (130) training survey score data 116 may be appropriate.

The preprocessing component 110 may utilize a division component 124 to split off testing survey score data 118 to include a subset of the training survey score data 116 from the training survey score data 116. The testing survey score data 118 is used to validate and tune hyper-parameters for the model. The division component 124 may select the testing survey score data 118 randomly or from a predetermined percentage of the training survey score data 116. For example, thirty percent (30%) of the training survey score data 116 will be divided into testing survey score data 118. The testing survey score data 118 may be used to tune the hyperparameters of the survey score prediction model trained on the training survey score data 116 less the testing survey score data 118. Tuning the model's hyperparameters with the testing survey score data 118 may increase the model's short-term-working memory, which improves the model's ability to account for seasonality.

As stated above, the preprocessing component 110 may process current survey score data 114, and actual survey score results 132 using the above components to generate prediction survey score data 146 to allow the system to generate expected survey score results and update the survey score prediction models. The prediction survey score data 146 is the same format and structure as the training survey score data 116 but only incorporates current survey score data 114 for the N lookback points from the date/date range to be predicted and the actual survey score result from the date/date range to be predicted.

The anomaly detection system 100 further incudes a modeling component 120 to generate and train survey score prediction models, generate expected survey scores and update survey score prediction models. The modeling component 120 receives a set of training survey score data 116 for a given scored survey metric and a given duration to train a survey score prediction model for the given scored survey metric and the given duration.

In an embodiment, the modeling component 120 trains the survey score prediction model iteratively on a training survey score data 116 at a time. This allows the modeling component 120 to adjust the weights of the survey score prediction model with each training survey score data 116 based on the error between the predicted survey score generated by the model and the actual testing survey score result provided in the training survey score data 116. In an embodiment, the modeling component 120 is a deep learning model or a statistical model. In various embodiments, the deep learning model is a recurrent neural network (RNN) based model, such as long short-term memory (LSTM) model, for example, or a transformer-based model. In an embodiment, the statistical model is an autoregressive based model, such as an autoregressive integrated moving average (ARIMA) model, for example.

To prevent overfitting of the model to the training data and improve model accuracy in detecting anomalies, the modeling component 120 uses regularization techniques. The regularization techniques reduce the complexity of the model and minimize the effect of noise created from the training data. In embodiments, example regularization techniques that may be employed include dropout, early stopping, weight decay regularization (L2), and/or Lasso regression (L1).

Once the survey score prediction model for a given scored survey metric and a given duration is trained on training survey score data 116, the modeling component 120 may receive testing survey score data 118 to validate and tune the hyperparameters of the trained survey score prediction model to improve the models' ability to account for seasonality. Tuning the survey score prediction model using the testing survey score data 118 validates which set of hyperparameters are to be used by the survey score prediction model. In an embodiment, the tuning validates the set of hyperparameters resulting in the lowest error. Once trained and optionally tuned, the modeling component 120 stores the survey score prediction model in a model store database 104.

Once the survey score prediction model for a given scored survey metric and a given duration is trained and optionally tuned, the survey score prediction model, utilized by the modeling component 120, can generate expected survey scores based on prediction survey score data 146 for a specific date/date range for the given scored survey metric and the given duration. Further, the modeling component 120 may update the survey score prediction model for the given scored survey metric and the given duration with the prediction survey score data 146 for the specific date/date range. It should be understood that the update of the survey score prediction model for the given scored survey metric and the given duration could occur either before or after the expected survey score is generated. Once updated, the modeling component 120 updates the survey score prediction model stored in the model store database 104 with the updated survey score prediction model.

The anomaly detection system 100 further includes an anomaly detection component 130 to identify anomalous actual survey score results, generate anomaly reports 108, and update an anomaly table database 106. The anomaly detection component 130 receives the expected survey score from the modeling component 120 for a given date/date range and the actual survey score result 132 from the survey scores database 102 for the given date/date range. The anomaly detection component 130 compares the expected survey score to the actual survey score result 132 and determines if the actual survey score result is an anomaly based on an analysis of the difference (positive or negative) between the expected survey score and the actual survey score result 132.

In an embodiment, the anomaly detection component 130 filters out actual survey score results 132 that are within a calculated confidence interval of the expected survey score and filters out actual survey score results 132 that are within a standard deviation band of the expected survey score based on dynamically generated user-defined anomaly parameters 148. The user-defined anomaly parameters 148 allow users to define what is considered an anomaly, which allows users to control the likelihood of false-positive anomaly detection and how strictly an anomaly is defined.

In an embodiment, user-defined anomaly parameters 148 include user-defined confidence levels for calculated confidence intervals and user-defined standard deviation bands. The user-defined anomaly parameters 148 are used to filter out scores that should not be considered when identifying anomalies. The standard deviation (also used as the basis for the confidence interval) is calculated for the sequence of scores of the prediction survey score data 146 for the actual survey score result 132 from the given date/date range. In other words, the standard deviation is calculated from the score component of the current survey score data 114 associated with the actual survey score result 132. As a non-limiting example, the anomaly detection component 130 calculates the confidence interval for t-distribution based on a user-provided desired confidence level (e.g., 90%, 95%, 99%, etc.). In an embodiment, user-provided confidence levels are within a range of eight-five percent (85%) to ninety-nine percent. It should be understood that this is merely an example or a range of acceptable confidence levels and should not be considered limiting. If the actual survey score result 132 is within the confidence interval, the actual survey score result 132 is filtered out from being considered an anomaly. As another non-limiting example, the anomaly detection component 130 calculates the standard deviation and generates a standard deviation band based on a user-defined augmentation of the standard deviation band (e.g., 4 times standard deviation, 2 times standard deviation, one-half (½) the standard deviation, etc.). In an embodiment the user-defined standard deviation augmentation may range from one-half (0.5) the standard deviation to four (4) times the standard deviation. It should be understood that this is merely an example range of acceptable standard deviation augmentations and should not be considered limiting. If the actual survey score result 132 is within the standard deviation band, the actual survey score result 132 is filtered out from being considered an anomaly.

If an anomaly is detected, the anomaly detection component 130 generates an anomaly report 108 and updates the anomaly table database 106. In an embodiment, the anomaly report 108 and the update to the anomaly table database 106 include the actual survey score result 132, the expected survey score, the error, the date/date range of the actual survey score result, and an indication of a positive or negative anomaly. The anomaly detection component 130 interacts with employee devices 140 to present anomaly reports 108.

The historic survey score data 112, current survey score data, survey score prediction models, training survey score data 116, testing survey score data 118, actual survey score results, expected survey scores, metric-specific averaged duration data points 144, prediction survey score data 146, user-defined anomaly parameters 148, and anomaly reports 108 may be stored in a storage component 160 for later use.

Figure 2:
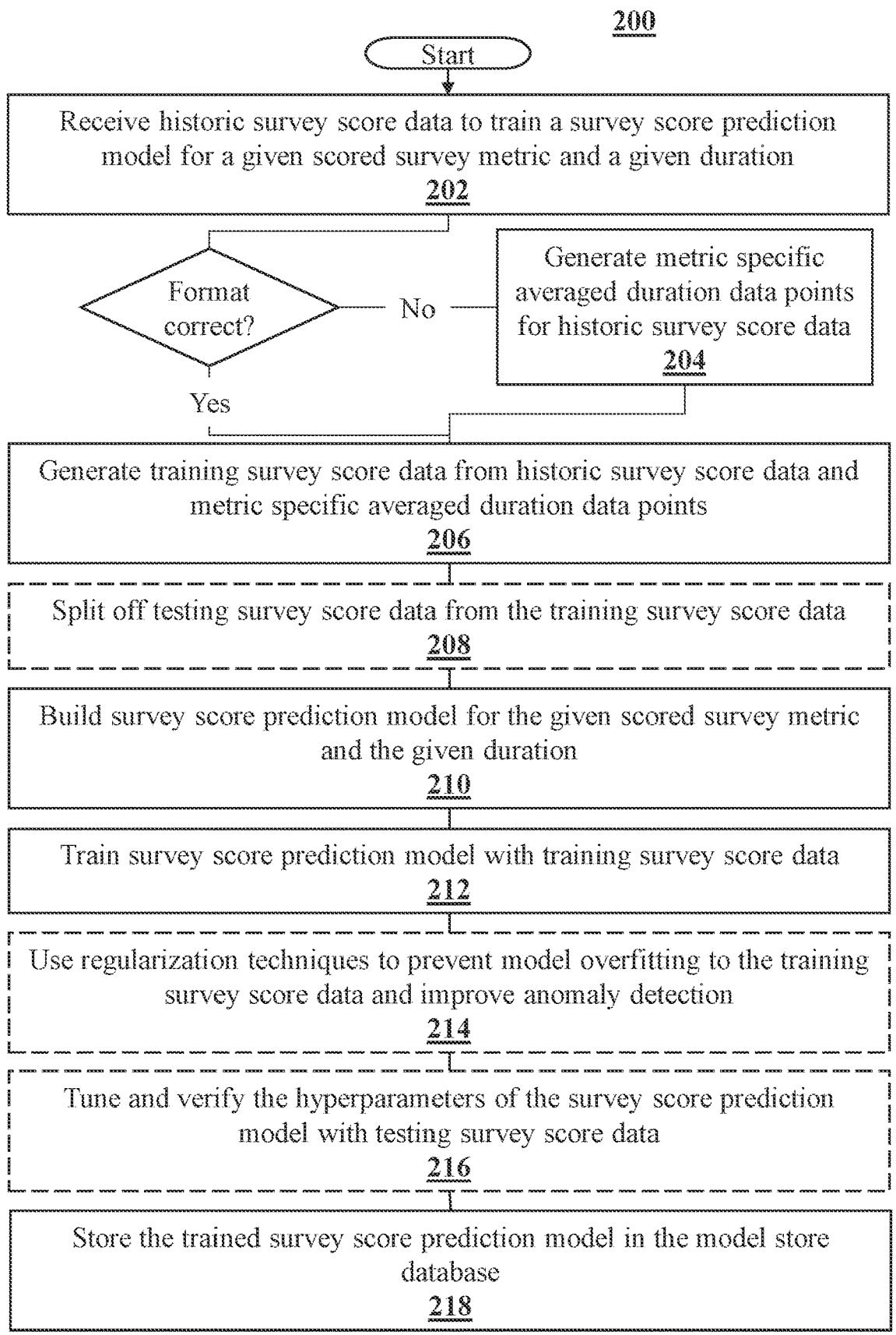
FIG. 2 depicts a flowchart of an example of a method for generating and training survey score prediction models, according to certain embodiments.

FIG. 2 depicts an example flow diagram of a method 200 for training a survey score prediction model according to certain embodiments. Blocks 202 through 210 form the data preprocessing blocks. Blocks 212 through 218 form the model generation and training blocks. The numbering and sequencing of the blocks are for reference only; blocks or sequences of blocks may be performed out of order or repeated.

As discussed above, each survey score prediction model is trained for a given scored survey metric and a given duration. The below description is an example method for training a specific survey score prediction model, but it should be understood that the anomaly detection system 100 may train any number of specific survey score prediction models simultaneously or near-simultaneously using the same method.

At block 202, historic survey score data 112 is received by the anomaly detection system 100 at the preprocessing component 110. Historic survey score data 112 is used to generate training survey score data 116 to train a survey score prediction model for a given scored survey metric and a given duration. In an embodiment, survey score prediction models are trained on time series event data of averaged survey scores for the given duration of the given scored survey metric. As discussed above, historic survey score data 112 may be received as raw historic survey score data or may be received as formatted history survey score data. Formatted historic survey score data is historic survey score data 112 that is already in the form of averaged survey scores for the given duration of the given scored survey metric. Raw historic survey score data is historic survey score data 112 that is not in the prescribed given duration and/or given scored survey metric form. For example, raw historic survey score data may include a mixture of scored survey metrics. As another non-limiting example, raw historic survey score data may include scores that are per survey score or average scores for a different duration than the given duration.

At block 204, metric-specific averaged duration data points 144 (having the same form as formatted historic survey score data) are generated from raw historic survey score data by the preprocessing component 110 using the score formatting component 152. The score formatting component 152 analyzes the received raw historic survey score data and removes all data that is not of the given scored survey metric. The score formatting component 152 then generates metric-specific averaged duration data points 144 from the remaining raw historic survey score data, where each metric-specific averaged duration data point 144 is a time-series event averaged score for the given duration. It should be understood that this block is not performed on formatted historic survey score data as formatted historic survey score data already only consists of data related to the given scored survey metric, with the score for each date/date range already represented as an average score for the given duration.

At block 206 training survey score data 116 is generated from the formatted historic survey score data and the metric-specific averaged duration data points 144 by the preprocessing component 110, using the grouping component 142. The grouping component 142 chronologically orders the formatted historic survey score data and the metric-specific averaged duration data points 144. The grouping component 142 then generates training survey score data 116 from the chronologically ordered data by grouping the score component for each N data points in order (the actual survey score results 132 used by the model to predict the expected survey score result) and the score component for the next N+1 data point (the actual survey score result 132 used by the model to determine the error of the prediction). Each training survey score data 116 consists of N+1 average scores for the given duration and given scored survey metric. In embodiments, the grouping component skips data points that have no score or a score of zero. In an embodiment, the grouping component 142 generates training survey score data 116 for all received formatted training survey score data and metric-specific averaged duration data points 144. In an embodiment, only a certain amount of training survey score data 116 is used to train the survey score prediction model, and the grouping component only generates the amount of training survey score data 116 needed to train the model using a subset of the formatted training survey score data and metric specific averaged duration data points 144 to do so.

In optional block 208, testing survey score data 118 are split off from the training survey score data 116 by the preprocessing component 110, using the division component 124. The division component selects a subset of training survey score data 116 to be withheld from initial training of the survey score prediction model and reserved as testing survey score data 118. The model will not consider the testing survey score data 118 during initial training. Instead, the testing survey score data 118 can be used after initial training to validate and tune the hyperparameters of the trained model.

At block 210, the system builds a survey score prediction model for the given scored survey metric and the given duration using the modeling component 120. In an embodiment, the survey score prediction model is a deep learning model or a statistical model. In various embodiments, the deep learning model is a recurrent neural network (RNN) based model, such as long short-term memory (LSTM) model, for example, or a transformer-based model. In an embodiment, the statistical model is an autoregressive based model, such as autoregressive integrated moving average (ARIMA) model, for example. It should be understood that for each scored survey metric and duration combination, the system trains one or more survey score prediction models.

At block 212, the survey score prediction model is trained on training survey score data 116 by the modeling component 120. In an embodiment, the modeling component 120 trains the survey score prediction model incrementally on each training survey score data 116. The first N scores of the first training survey score data 116 are provided to the survey score prediction model. The survey score prediction model predicts an expected survey score result based on the first N scores. The expected survey score result is compared to the first N+1 score (the actual test survey score result), and based on the difference, the weights of the model are modified to improve the difference between the generated expected survey score metric and the actual test survey score result (each N+1 score of each training survey score data 116). The incremental training is repeated with the remaining training survey score data 116 until all training survey score data 116 is processed. In an embodiment, the training on the training survey score data 116 continues for a number of epochs. For each epoch, the model is trained using the training survey score data 116 on altered hyperparameter settings. After the model has been trained for the number of epochs, the model version with the lowest error rate is picked to be the survey score prediction model for the given scored survey metric and the given duration. In an embodiment, the number of epochs is determined, at least in part, by the model and the training data. Too many epochs and the model will be overfitted to the training data; too few epochs and the model will be underfit to the training data.

In optional block 214, to prevent overfitting of the model to the training date and improve model accuracy in detecting anomalies, the modeling component 120 uses regularization techniques while performing the training at block 212. In an embodiment, the regularization techniques may include L2, L1, early stopping and/or dropout regularization. It should be understood that these are merely examples of regression techniques that may be used and should not be considered limiting.

In optional block 216, the hyperparameters of the survey score prediction model are verified and tuned using testing survey score data 118 by the modeling component 120. The modeling component 120 tests the model versions from the epoch testing at block 212 with the testing survey score data 118 to verify which model variation has the lowest error score.

At block 218, the anomaly detection system 100 using the modeling component 120 stores the trained survey score prediction model in the model store database 104. Additionally, the trained survey score prediction model may be stored in the storage component 160 and/or some other anomaly detection system 100 storage and/or customer service center system storage.

Figure 3A:
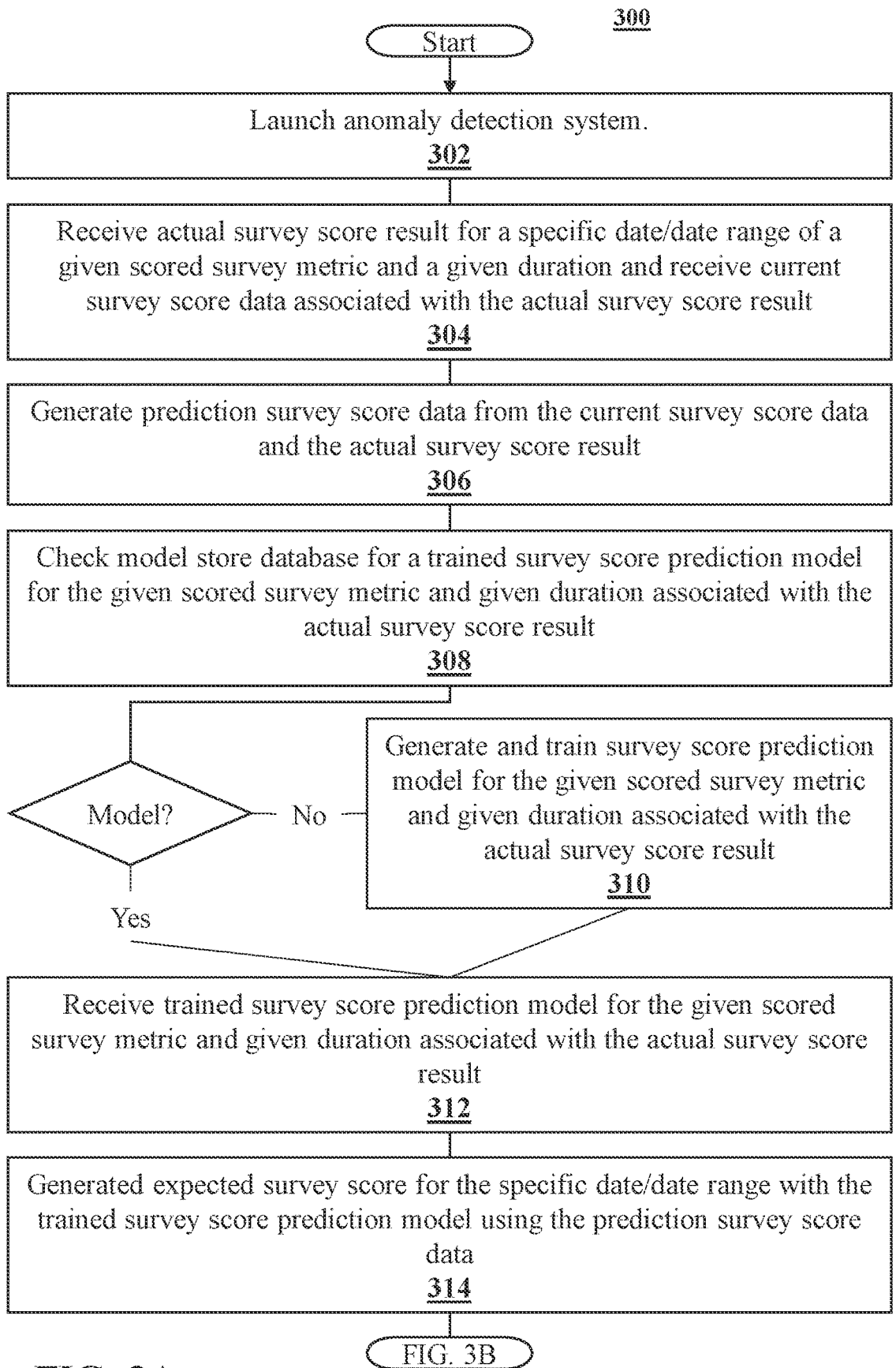
FIGS. 3A and 3B depict a flowchart of an example of a method for anomaly detection using survey score prediction models, according to certain embodiments.
Figure 3B:
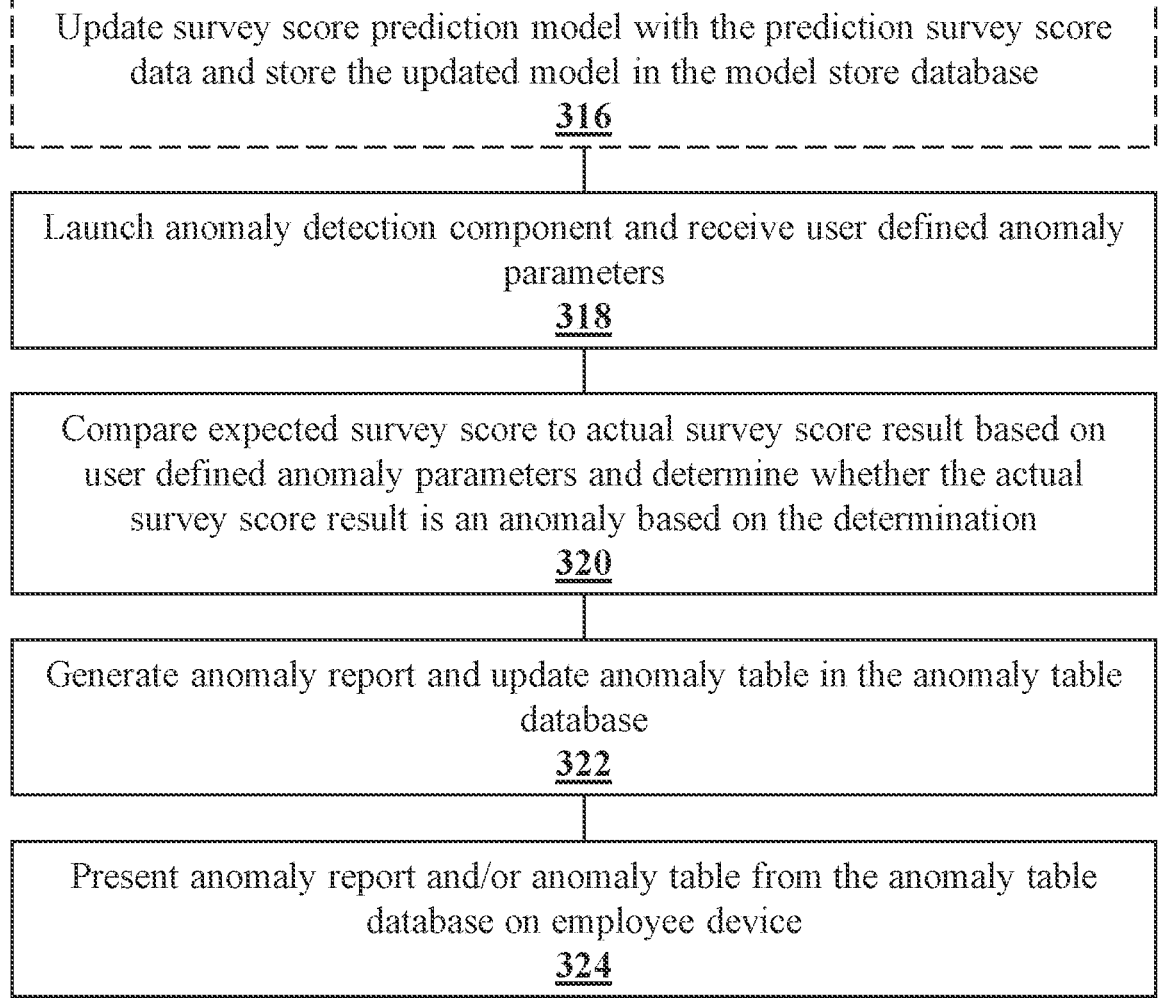

FIGS. 3A and 3B depict an example flow diagram of operations performed by the anomaly detection system 100 according to certain embodiments. The numbering and sequencing of the blocks are for reference only; blocks or sequences of blocks may be performed out of order or repeated.

At block 302, the anomaly detection system 100 is launched to detect anomalies for actual survey score results 132. The anomaly detection for actual survey score results 132 may occur automatically (e.g., daily, weekly, monthly, every time new survey scores are added to the survey scores database 102, or on any other basis that a company may want to schedule anomaly detection) or may be manually requested by users of the system.

At block 304, the anomaly detection system 100 at the preprocessing component 110 receives an actual survey score result 132 for a specific date/date range of a given scored survey metric and a given duration and current survey score data 114 associated with the actual survey score result 132. The actual survey score result 132 may be for any date/date range associated with any scored survey metric and any duration for which an actual survey score result 132 exists. As indicated above, current survey score data 114 is the historic survey score data 112 needed for the survey score prediction model for the given duration and given scored survey metric to generate an expected survey score for the specific data/date range of the actual survey score result 132.

At block 306, prediction survey score data 146 is generated from the current survey score data 114 and actual survey score result by the preprocessing component 110. The methods from blocks 204 and 206 from FIG. 2 are used to generate the prediction survey score data 146.

At block 308, the modeling component 120 receives the prediction survey score data 146 and checks the model store database 104 for a trained survey score prediction model for the given scored survey metric and given duration associated with the actual survey score result 132.

At block 310, if a trained survey score prediction model for the given scored survey metric and given duration associated with the actual survey score result 132 does not exist, the system generates and trains a survey score prediction model for the given scored survey metric and given duration associated with the actual survey score result 132 using the preprocessing component 110 and modeling component 120. Blocks 202 through 216, as shown in FIG. 2, are used for training the survey score prediction model for the given scored survey metric and given duration associated with the actual survey score result 132.

At block 312, the modeling component 120 receives the trained survey score prediction model for the given scored survey metric and given duration associated with the actual survey score result 132.

At block 314, the expected survey score is generated by the modeling component 120 from the survey score prediction model based on the prediction survey score data 146 for the given date/date range for the actual survey score result 132.

In optional block 316, the survey score prediction model is updated by the modeling component 120 with the prediction survey score data 146. The method of block 212 depicted in FIG. 2 can be used to update the survey score prediction model. The updated model is stored in the model store database 104, replacing the previous model.

At block 318, the system launches an anomaly detection component 130. The anomaly detection component 130 receives an actual survey score result for a specific date/date range of a given scored survey metric and a given duration, the expected survey score for the specific date/date range of the given scored survey metric, and the given duration. Receive user-defined anomaly parameters 148. The user-defined anomaly parameters 148 allow the user to specify the confidence level and standard deviation band for identifying anomalous actual survey score results.

At block 320, the actual survey score result 132 for the specific date/date range is compared to the expected survey score for the specific date/date range by the anomaly detection component 130 to determine whether the actual survey score result 132 is an anomaly. In an embodiment, based on the received user-defined anomaly parameter 148 for confidence level, the confidence interval is calculated for the expected survey score. In an embodiment, based on the received user-defined anomaly parameter 148 for standard deviation augmentation, the standard deviation band is calculated for the expected survey score. In an embodiment, if the actual survey score result 132 is outside of the calculated confidence level and/or outside of the calculated standard deviation band, it is marked by the anomaly detection component 130 as an anomaly. In an embodiment, If the actual survey score result 132 is within the calculated confidence level and/or within the calculated standard deviation band, it is marked by the anomaly detection component 130 as not being an anomaly.

At block 322, an anomaly report 108 is generated by the anomaly detection component 130 for actual survey score results determined to be anomalies. Additionally, an anomaly table database 106 is updated with detected anomalies.

At block 324, the anomaly report 108 and/or the anomaly table database 106 is presented on an employee device 140.

Figure 4A:
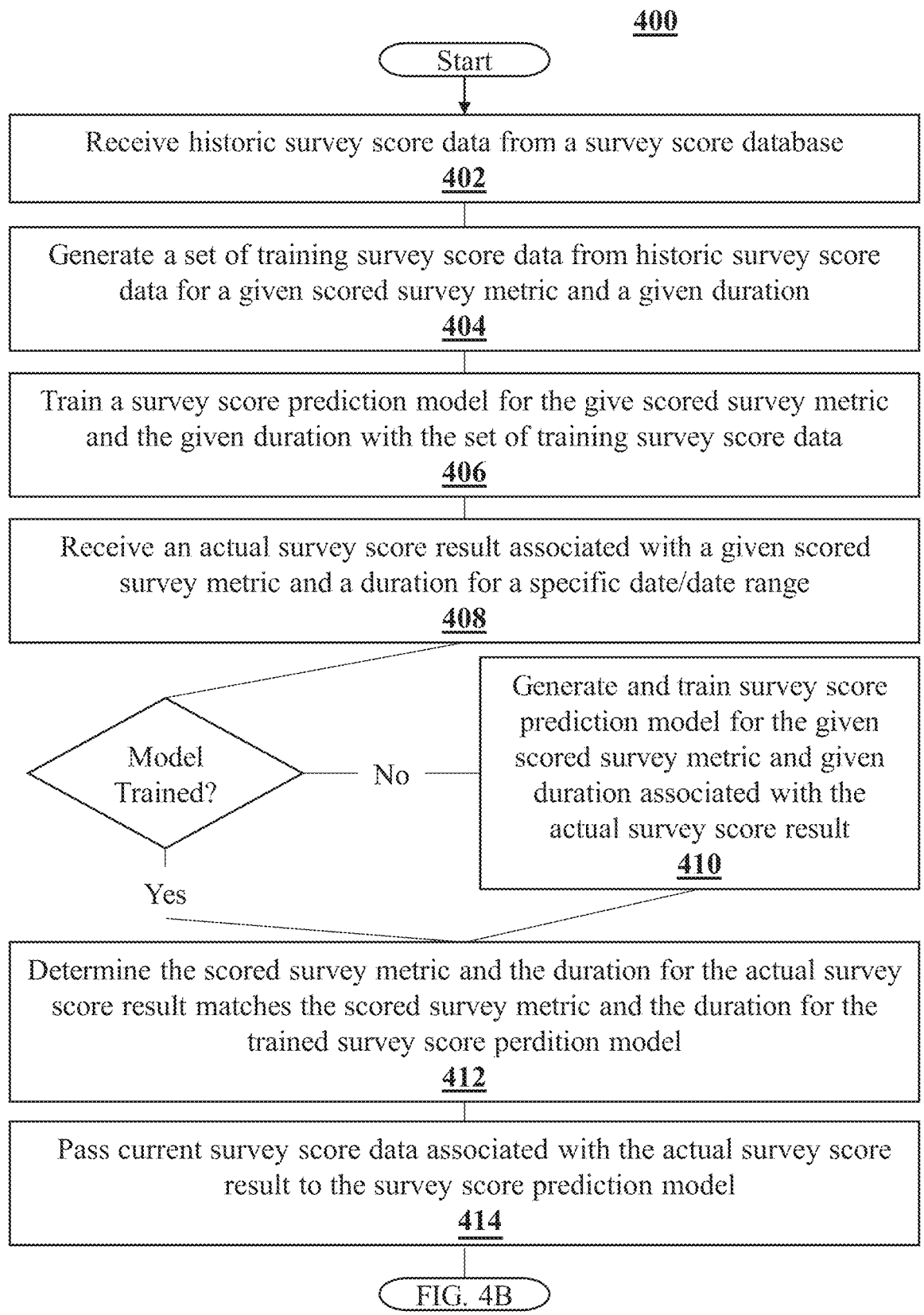

FIGS. 4A and 4B depict an example flow diagram of operations performed by the anomaly detection system 100 according to certain embodiments. The numbering and sequencing of the blocks are for reference only; blocks or sequences of blocks may be performed out of order or repeated.

At block 402, the anomaly detection system 100 receives, at the preprocessing component 110, historic survey score data from the survey scores database 102. Historic survey score data 112 is used to generate training survey score data 116 to train a survey score prediction model for a given scored survey metric and a given duration. In an embodiment, survey score prediction models are trained on time series event data of averaged survey scores for the given duration of the given scored survey metric.

At block 402, the preprocessing component 110, using a grouping component 142, generates a set of training survey score data 116 for a give scored survey metric and a given duration from the received historic survey score data 112. The grouping component 142 chronologically orders the historic survey score data 112. The grouping component 142 then generates training survey score data 116 from the chronologically ordered data by grouping the score component for each N data points in order (the actual survey score results 132 used by the model to predict the expected survey score result) and the score component for the next N+1 data point (the actual survey score result 132 used by the model to determine the error of the prediction). Each training survey score data 116 consists of N+1 average scores for the given duration and given scored survey metric. It should be understood that the preprocessing component may perform additional steps prior to grouping the historic survey score data 112 to properly format the historic survey score data for generation of training survey score data 116.

At block 404, a survey score prediction model is trained with the set of training survey score data 116 by a modeling component 120. In an embodiment, the modeling component 120 trains the survey score prediction model incrementally on each training survey score data 116. The first N scores of the first training survey score data 116 are provided to the survey score prediction model. The survey score prediction model predicts an expected survey score result based on the first N scores. The expected survey score result is compared to the first N+1 score (the actual test survey score result), and based on the difference, the weights of the model are modified to improve the difference between the generated expected survey score metric and the actual test survey score result (each N+1 score of each training survey score data 116). The incremental training is repeated with the remaining training survey score data 116 until all training survey score data 116 is processed. In an embodiment, the training on the training survey score data 116 continues for a number of epochs. For each epoch, the model is trained using the training survey score data 116 on altered hyperparameter settings. After the model has been trained for the number of epochs, the model version with the lowest error rate is picked to be the survey score prediction model for the given scored survey metric and the given duration. In an embodiment, the number of epochs is determined, at least in part, by the model and the training data. Too many epochs and the model will be overfitted to the training data; too few epochs and the model will be underfit to the training data.

At block 408, the anomaly detection system 100 at the modeling component 120 receives an actual survey score result 132 for a specific date/date range associated with a given scored survey metric and a given duration and current survey score data 114 associated with the actual survey score result 132. It should be understood that the preprocessing component 110 may process the actual survey score result 132 and the current survey score data 114 prior to receipt at the modeling component 120 to properly format the actual survey score result 132 and the current survey score data 114 for the model. The actual survey score result 132 may be for any date/date range associated with any scored survey metric and any duration for which an actual survey score result 132 exists. As indicated above, current survey score data 114 is the historic survey score data 112 needed for the survey score prediction model for the given duration and given scored survey metric to generate an expected survey score for the specific data/date range of the actual survey score result 132. The modeling component 120 checks the scored survey metric and the duration associated with the actual survey score result 132 against the duration and the scored survey metric associated with the trained survey score prediction model from block 404. Optionally, the modeling component 120 also checks the model store database 104 for a trained survey score prediction model for the given scored survey metric and given duration associated with the actual survey score result 132.

At block 410, if a trained survey score prediction model for the given scored survey metric and given duration associated with the actual survey score result 132 does not exist, the system generates and trains a survey score prediction model for the given scored survey metric and given duration associated with the actual survey score result 132 using the preprocessing component 110 and modeling component 120. Blocks 202 through 216, as shown in FIG. 2, are used for training the survey score prediction model for the given scored survey metric and given duration associated with the actual survey score result 132.

At block 412, the modeling component 120 determines that the scored survey metric and the duration for the actual survey score result 132 matches the scored survey metric and the duration for the survey score prediction model trained at block 404. Optionally, the modeling component 120 determines that the scored survey metric and the duration for the actual actual survey score result 132 matches the scored survey metric and the duration for a survey score prediction model in the survey scores database 102 and receives the matching survey scored prediction model from the survey scores database.

At block 414, the modeling component 120 passes the current survey score data 114 associated with the actual survey score result 132 to the survey score prediction model.

At block 416, the modeling component 120 generates a expected survey score from the survey score prediction model based on the current survey score data 114.

At block 418, a anomaly detection component 130 receives a user-defined confidence level and a user-defined standard deviation augmentation for identifying anomalous actual survey score results. In an embodiment, the user-defined confidence level may be in the range of eighty-five percent (85%) to ninety-nine percent (99%). In an embodiment, the user-defined standard deviation augmentation may be in a range of one half (0.5) times the standard deviation to four (4) times the standard deviation. It should be understood that these are merely examples and the user-defined confidence level and the user-defined standard deviation augmentation may be any percentage or standard deviation band, respectively, and the above should not be considered limiting.

At block 420, the anomaly detection component 130 generates a confidence interval for the expected survey score based on the user-defined confidence level.

At block 422, the anomaly detection component 130 generates a standard deviation band for the expected survey score based on a standard deviation and the user-defined standard deviation augmentation.

At block 424, the anomaly detection component 130 determines that the the actual survey score result 132 is an anomaly if the actual survey score result is outside of the confidence interval and outside of the standard deviation band.

At block 426, the anomaly detection component 130 determines that the the actual survey score result 132 is not an anomaly if the actual survey score result is within the confidence interval or within the standard deviation band.

At block 428, an anomaly report 108 is generated by the anomaly detection component 130 for actual survey score result. Additionally, an anomaly table database 106 is updated with detected anomalies.

In optional block 430, the anomaly report 108 and/or the anomaly table database 106 is presented on an employee device 140.

Figure 5:
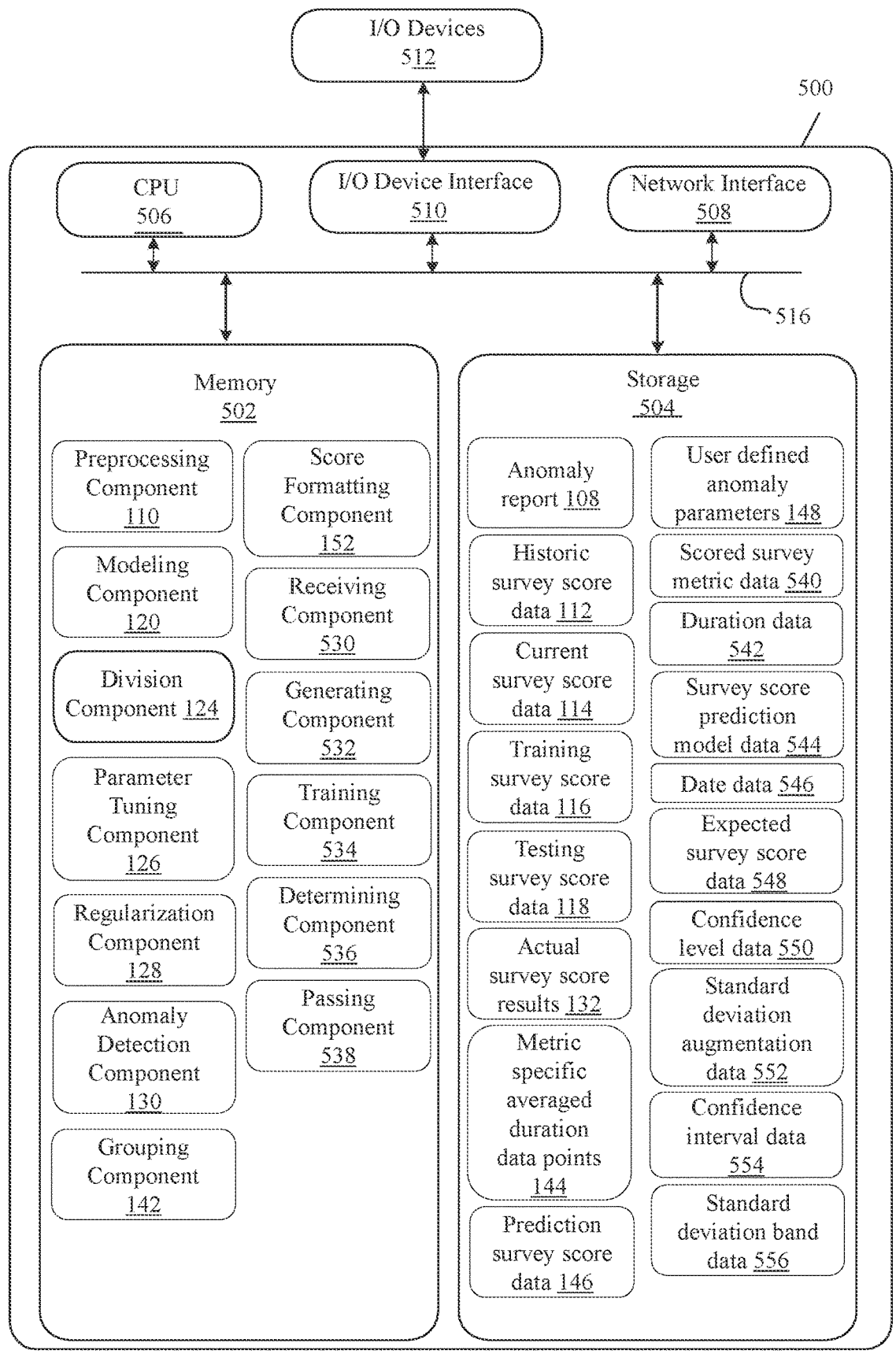
FIG. 5 depicts an example diagram of a computer system that may be utilized to implement anomaly detection in accordance with the disclosure according to certain embodiments.

FIG. 5 depicts an example embodiment of a computer system 500 that may include the kinds of software programs, data stores, hardware, and interfaces that can implement anomaly detection and anomaly detection system 100 as disclosed herein and according to certain embodiments. The computing system 500 may be used to implement embodiments of portions of the anomaly detection system 100 or in carrying out embodiments of method 200, method 300 and/or method 400. The computing system 500 may be part of or connected to an overarching customer service center system.

As shown, the computer system 500 includes, without limitation, a memory 502, a storage 504, a central processing unit (CPU) 506, and a network interface 508, each connected to a bus 516. The computing system 500 may also include an input/output (I/O) device interface 510 connecting I/O devices 512 (e.g., keyboard, display, and mouse devices) and/or a network interface 508 to the computing system 500. Further, the computing elements shown in computer system 500 may correspond to a physical computing system (e.g., a system in a data center), a virtual computing instance executing within a computing cloud, and/or several physical computing systems located in several physical locations connected through any combination of networks and/or computing clouds.

Computing system 500 is a specialized system specifically designed to perform the steps and actions necessary to execute methods 200, 300, and 400 and anomaly detection system 100. While some of the component options for computing system 500 may include components prevalent in other computing systems, computing system 500 is a specialized computing system specifically capable of performing the steps and processes described herein.

The CPU 506 retrieves, loads, and executes programming instructions stored in the memory 502. The bus 516 is used to transmit programming instructions and application data between the CPU 506, I/O interface 510, network interface 508, and memory 502. Note, the CPU 506 can comprise a microprocessor and other circuitry that retrieves and executes programming instructions from memory 502. CPU 506 can be implemented within a single processing element (which may include multiple processing cores) but can also be distributed across multiple processing elements (with or without multiple processing cores) or sub-systems that cooperate in existing program instructions. Examples of CPUs 506 include central processing units, application-specific processors, and logic devices, as well as any other type of processing device, a combination of processing devices, or variations thereof. While there are a number of processing devices available to compromise the CPU 506, the processing devices used for the CPU 506 are particular to this system and are specifically capable of performing the processing necessary to execute methods 200, 300, and 400 and anomaly detection system 100.

The memory 502 can comprise any memory media readable by CPU 506 that is capable of storing programming instructions and able to meet the needs of the computing system 500 and execute the programming instructions required for methods 200, 300, and 400 and anomaly detection system 100. The memory 502 is generally included to be representative of a random access memory. In addition, the memory 502 may include volatile and non-volatile, removable and non-removable media implemented in any method or technology for storage of information, such as computer-readable instructions or program components. The memory 502 may be implemented as a single memory device but may also be implemented across multiple memory devices or sub-systems. The memory 502 can further include additional elements, such as a controller capable of communicating with the CPU 506.

Illustratively, the memory includes multiple sets of programming instructions for performing the functions of anomaly detection system 100 and methods 200, 300, and 400, including, but not limited to, preprocessing component 110, modeling component 120, division component 124, parameter tuning component 126, regularization component 128, anomaly detection component 130, grouping component 142, and score formatting component 152, all of which are discussed in greater detail herein. Illustratively, the memory may also include a receiving component 530, a generating component 532, a training component 534, a determining component 536, and a passing component 538. Although memory 503 as depicted in FIG. 5 includes twelve sets of programming instruction components in the present example, it should be understood that one or more components could perform single- or multi-component functions. It is also contemplated that these components of computing system 500 may be operating in a number of physical locations.

The storage 504 can comprise any storage media readable by CPU 506, and capable of storing data that is able to meet the needs of computing system 500 and store the data required for methods 200, 300, and 400 and anomaly detection system 100. The storage 504 may be a disk drive or flash storage device. The storage 504 may include volatile and non-volatile, removable and non-removable media implemented in any method or technology for storage of information. Although shown as a single unit, the storage 504 may be a combination of fixed and/or removable storage devices, such as fixed disc drives, removable memory cards, optical storage, network-attached storage (NAS), or a storage area-network (SAN). The storage 504 can further include additional elements, such as a controller capable of communicating with the CPU 506.

Illustratively, the storage 504 may store data such as but not limited to anomaly reports 108, historic survey score data 112, current survey score data 114, training survey score data 116, testing survey score data 118, actual survey score results 132, metric specific averaged duration data points 144, prediction survey score data 146, and/or user-defined anomaly parameters 148, all of which are also discussed in greater detail herein. Illustratively, the storage 504 may also store data such as but not limited to scored survey metric data 540, duration data 542, survey score prediction model data 544, date/date range data 546, expected survey score result 548, user-defined confidence level data 550, user-defined standard deviation augmentation data 552, confidence interval data 554, standard deviation band data 556, and anomaly table data 558.

Examples of memory and storage media include random access memory, read-only memory, magnetic discs, optical discs, flash memory, virtual memory, and non-virtual memory, magnetic sets, magnetic tape, magnetic disc storage, or other magnetic storage devices, or any other medium which can be used to store the desired software components or information that may be accessed by an instruction execution system, as well as any combination or variation thereof, or any other type of storage medium. In some implementations, one or both of the memory and storage media can be a non-transitory memory and storage media. In some implementations, at least a portion of the memory and storage media may be transitory. Memory and storage media may be incorporated into computing system 500. While many types of memory and storage media may be incorporated into computing system 500, the memory and storage media used is capable of executing the storage requirements of methods 200, 300, and 400 and anomaly detection system 100 as described herein.

The I/O interface 510 allows computing system 500 to interface with I/O devices 415. I/O devices 512 can include one or more employee devices 140, graphical user interfaces, desktops, a mouse, a keyboard, a voice input device, a touch input device for receiving a gesture from a user, a motion input device for detecting non-touch gestures and other motions by a user, and other comparable I/O devices and associated processing elements capable of receiving input. The I/O devices 512 through the employee devices 140 are also integrated into the system allowing users to access the telephone system, internet system, and a text communications system, among other systems. I/O devices 512 can also include devices such as a video display or graphical display and other comparable I/O devices and associated processing elements capable of providing output. Speakers, printers, haptic devices, or other types of output devices may also be included in the I/O device 512.

A user can communicate with computing system 500 through the I/O device 512 in order to view anomaly table from the anomaly table database 106, anomaly reports 108, historic survey score data 112, current survey score data 114, training survey score data 116, testing survey score data 118, actual survey score results 132, metric specific averaged duration data points 144, prediction survey score data 146, and/or user-defined anomaly parameters 148, or complete any number of other tasks the user may want to complete with computing system 500. I/O devices 512 can receive and output data such as but not limited to, anomaly table from the anomaly table database 106, anomaly reports 108, historic survey score data 112, current survey score data 114, training survey score data 116, testing survey score data 118, actual survey score results 132, metric specific averaged duration data points 144, prediction survey score data 146, and/or user-defined anomaly parameters 148.

As described in further detail herein, computing system 500 may receive and transmit data from and to the network interface 508. In embodiments, the network interface 508 operates to send and/or receive data, such as but not limited to, anomaly table from the anomaly table database 106, anomaly reports 108, historic survey score data 112, current survey score data 114, training survey score data 116, testing survey score data 118, actual survey score results 132, metric specific averaged duration data points 144, prediction survey score data 146, and/or user-defined anomaly parameters 148 to/from other devices and/or systems to which computing system 500 is communicatively connected, and to receive and process interactions as described in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the foregoing description.

What is claimed is:

1. A method for detecting anomalies in actual survey score results, the method comprising:
   receiving, by a preprocessing component, historic survey score data from a survey scores database;
   generating, by the preprocessing component, a set of training survey score data for a given scored survey metric and a given duration from the historic survey score data, using a score formatting component, a grouping component, and a division component;
   generating, by a modeling component, a survey score prediction model for the given scored survey metric and the given duration;
   training the survey score prediction model to generate an expected survey score for the given scored survey metric and given duration with the set of training survey score data;
   receiving, by the preprocessing component, an actual survey score result associated with a scored survey metric and a duration for a specific date;
   determining, by the preprocessing component, the scored survey metric and the duration for the actual survey score result match the given scored survey metric and the given duration for the survey score prediction model;
   passing, to the modeling component, a current survey score data associated with the actual survey score result to use the survey score prediction model associated with the given scored survey metric and the given duration;
   generating, by the modeling component, an expected survey score for the specific date based on the current survey score data using the survey score prediction model;

receiving, by an anomaly detection component, a user-defined confidence level and a user-defined standard deviation augmentation;

generating, by the anomaly detection component, a confidence interval for the expected survey score based on the user-defined confidence level;

generating, by the anomaly detection component, a standard deviation band for the expected survey score based on a standard deviation and the user-defined standard deviation augmentation;

determining, by the anomaly detection component, the actual survey score result is an anomaly when the actual survey score result is outside the confidence interval and when the actual survey score result is outside of the standard deviation band;

generating, by the anomaly detection component, an anomaly report for the actual survey score result;

updating, by the modeling component, the survey score prediction model with a set of prediction survey score data to improve the survey score prediction model's ability to predict the expected survey score, wherein the set of survey score prediction data includes the current survey score data; and replacing the survey score prediction model with the updated survey score prediction model.

2. The method of claim 1, wherein the survey score prediction model is a deep learning model or a statistical model.

3. The method of claim 1, further comprising determining the actual survey score result is not an anomaly when the actual survey score result is within the confidence interval or when the actual survey score result is within the standard deviation band.

4. The method of claim 1, further comprising:
determining at least one of the scored survey metric or the duration for the actual survey score result does not match the given scored survey metric or the given duration for the survey score prediction model;

searching a model store database for a different survey score prediction model for the scored survey metric and the duration associated with the actual survey score result;

receiving the different survey score prediction model for the scored survey metric and the duration associated with the actual survey score result from the model store database;

passing the current survey score data associated with the actual survey score result to the different survey score prediction model; and generating the expected survey score for the specific date using the different survey score prediction model.

5. The method of claim 4, further comprising:
determining the different survey score prediction model for the scored survey metric and the duration associated with the actual survey score result is not in the model store database;

generating a different set of training survey score data for the scored survey metric and the duration associated with the actual survey score result from the historic survey score data;

generating, by the modeling component, the different survey score prediction model for the scored survey metric and the duration associated with the actual survey score result; and training the different survey score prediction model for the scored survey metric and the duration associated with the actual survey score result with the different set of training survey score data.

6. The method of claim 1, further comprising tuning a set of hyperparameters for the survey score prediction model with a set of testing survey score data and selecting a model variation from a plurality of model variations that has a lowest error score for use as the survey score prediction model.

7. The method of claim 1, further comprising storing the survey score prediction model in a model store database.

8. A system for detecting anomalies in actual survey score results, the system comprising:
a memory comprising computer readable instructions;
a processor configured to read the computer readable instructions that when executed causes the system to:
receive historic survey score data from a survey scores database;

generate a set of training survey score data for a given scored survey metric and a given duration from the historic survey score data;

generate a survey score prediction model for the given survey metric and the given duration;

train the survey score prediction model to generate an expected survey score for the given scored survey metric and given duration with the set of training survey score data;

receive an actual survey score result associated with a scored survey metric and a duration for a specific date;

determine the scored survey metric and the duration for the actual survey score result match the given scored survey metric and the given duration for the survey score prediction model;

pass a current survey score data associated with the actual survey score result to use the survey score prediction model associated with the given scored survey metric and the given duration;

generate an expected survey score for the specific date based on the current survey score data using the survey score prediction model;

receive a user-defined confidence level and a user-defined standard deviation augmentation;

generate a confidence interval for the expected survey score based on the user-defined confidence level;

generate a standard deviation band for the expected survey score based on a standard deviation and the user-defined standard deviation augmentation;

determine the actual survey score result is an anomaly when the actual survey score result is outside the confidence interval and when the actual survey score result is outside of the standard deviation band;

generate an anomaly report for the actual survey score result update the survey score prediction model with a set of prediction survey score data to improve the survey score prediction model's ability to predict the expected survey score, wherein the set of survey score prediction data includes the current survey score data; and replace the survey score prediction model with the updated survey score prediction model.

9. The system of claim 8, wherein the survey score prediction model is a deep learning model or a statistical model.

10. The system of claim 8, wherein the system is further caused to determine the actual survey score result is not an anomaly when the actual survey score result is within the confidence interval or when the actual survey score result is within the standard deviation band.

11. The system of claim 8, wherein the system is further caused to:
    determine at least one of the scored survey metric or the duration for the actual survey score result does not match the given scored survey metric or the given duration for the survey score prediction model;
    search a model store database for a different survey score prediction model for the scored survey metric and the duration associated with the actual survey score result;
    receive the different survey score prediction model for the scored survey metric and the duration associated with the actual survey score result from the model store database;
    pass the current survey score data associated with the actual survey score result to the different survey score prediction model; and
    generate the expected survey score for the specific date using the different survey score prediction model.

12. The system of claim 11, wherein the system is further caused to:
    determine the different survey score prediction model for the scored survey metric and the duration associated with the actual survey score result is not in the model store database;
    generate a different set of training survey score data for the scored survey metric and the duration associated with the actual survey score result from the historic survey score data;
    generate the different survey score prediction model for the scored survey metric and the duration associated with the actual survey score result; and
    train the different survey score prediction model for the scored survey metric and the duration associated with the actual survey score result with the different set of training survey score data.

13. The system of claim 8, wherein the system is further caused to tune a set of hyperparameters for the survey score prediction model with a set of testing survey score data and selecting a model variation from a plurality of model variations that has a lowest error score for use as the survey score prediction model.

14. The system of claim 8, wherein the system is further caused to store the survey score prediction model in a model store database.

15. A non-transitory computer readable medium comprising computer readable code to detect anomalies in actual survey score results on a system that when executed by a processor, causes the system to:
    receive historic survey score data from a survey scores database;
    generate a set of training survey score data for a given scored survey metric and a given duration from the historic survey score data;
    generate a survey score prediction model for the given scored survey metric and the given duration;
    train the survey score prediction model to generate an expected survey score for the given scored survey metric and given duration with the set of training survey score data;
    receive an actual survey score result associated with a scored survey metric and a duration for a specific date;
    determine the scored survey metric and the duration for the actual survey score result match the given scored survey metric and the given duration for the survey score prediction model;
    pass a current survey score data associated with the actual survey score result to use the survey score prediction model associated with the given scored survey metric and given duration;
    generate an expected survey score for the specific date based on the current survey score data using the survey score prediction model;
    receive a user-defined confidence level and a user-defined standard deviation augmentation;
    generate a confidence interval for the expected survey score based on the user-defined confidence level;
    generate a standard deviation band for the expected survey score based on a standard deviation and the user-defined standard deviation augmentation;
    determine the actual survey score result is an anomaly when the actual survey score result is outside the confidence interval and when the actual survey score result is outside of the standard deviation band;
    generate a anomaly report for the actual survey score result
    update, by the modeling component, the survey score prediction model with a set of prediction survey score data to improve the survey score prediction model's ability to predict the expected survey score, wherein the set of survey score prediction data includes the current survey score data; and
    replace the survey score prediction model with the updated survey score prediction model.

16. The non-transitory computer readable medium of claim 15, wherein the survey score prediction model is a recurrent neural network based model, a transformer based model, or an autoregressive based statistical model.

17. The non-transitory computer readable medium of claim 15, wherein the system is further caused to:
    determine at least one of the scored survey metric or the duration for the actual survey score result does not match the given scored survey metric or the given duration for the survey score prediction model;
    search a model store database for a different survey score prediction model for the scored survey metric and the duration associated with the actual survey score result;
    receive the different survey score prediction model for the scored survey metric and the duration associated with the actual survey score result from the model store database;
    pass the current survey score data associated with the actual survey score result to the different survey score prediction model; and
    generate the expected survey score for the specific date using the different survey score prediction model.

18. The non-transitory computer readable medium of claim 17, wherein the system is further caused to:
    determine the different survey score prediction model for the scored survey metric and the duration associated with the actual survey score result is not in the model store database;
    generate a different set of training survey score data for the scored survey metric and the duration associated with the actual survey score result from the historic survey score data;
    generate the different survey scored prediction model for the scored survey metric and the duration associated with the actual survey score result; and
    train the different survey score prediction model for the scored survey metric and the duration associated with the actual survey score result with the different set of training survey score data.

19. The non-transitory computer readable medium of claim 15, wherein the system is further caused to tune a set of hyperparameters for the survey score prediction model with a set of testing survey score data and selecting a model variation from a plurality of model variations that has a lowest error score for use as the survey score prediction model.

20. The non-transitory computer readable medium of claim 15, wherein the system is further caused to determine the actual survey score result is not an anomaly when the actual survey score result is within the confidence interval or when the actual survey score result is within the standard deviation band.

\* \* \* \* \*